United States Patent
Gilinson, Jr. et al.

[11] 3,722,262
[45] Mar. 27, 1973

[54] OSCILLATING VISCOMETER

[75] Inventors: Philip J. Gilinson, Jr., Chelmsford; Charles R. Dauwalter, Waban, both of Mass.

[73] Assignee: Massachusetts Institute of Technology, Cambridge, Mass.

[22] Filed: Mar. 16, 1972

[21] Appl. No.: 235,279

[52] U.S. Cl. .................................................73/59
[51] Int. Cl. ...........................................G01n 11/16
[58] Field of Search.....................................73/59, 54

[56] References Cited

UNITED STATES PATENTS 3,343,405   9/1967   Gilinson, Jr. et al. ..................73/59

Primary Examiner—Louis R. Prince
Assistant Examiner—Joseph W. Roskos
Attorney—Arthur A. Smith, Jr. et al.

[57] ABSTRACT

For complex rheological studies, a viscometer is employed having a fixed and temperature controlled first element and a rotatable second element with a fluid whose viscous properties are to be measured contained between the two elements. A precision drive circuit is provided for oscillating the second element with respect to the first element at very slow shear rates in accordance with a periodic electrical signal whose waveform is variable. The current required to rotate or stop the second element is measured against time and angular displacement to provide an indication of fluid viscous properties and to permit separate detection of the elastic and viscous responses of the fluid.

18 Claims, 10 Drawing Figures

OSCILLATING VISCOMETER

The work herein described was made in the course of work performed under a contract with the Department of the Navy.

FIELD OF THE INVENTION

This invention relates to viscometers and in particular to an oscillating viscometer adapted for very slow oscillations to provide for the separate measurement of fluid viscosity and elasticity.

BACKGROUND OF THE INVENTION

In the precise measurement of fluid viscosity and related properties it is customary to produce a fluid shear rate resulting from the relative rotation between the elements of a viscometer that contact the fluid under study. Because the fluid reaction to this relative motion is often best observed at low shear rates it is important to be able to accurately produce and detect very low drags between the elements. Measurement of these low drags has previously been impeded by the noise introduced into the viscometer from mechanical drive and control components. Accordingly, a low noise viscometer becomes an important objective for a viscosity measuring instrument. Viscous properties, especially in the case of non-Newtonian fluids, are complex and often nonlinear requiring that the fluid be subjected to different stresses by the viscometer in order to attain a complete fluid analysis. It is thus desirable to be able to control the relative rotation of the viscometer elements to provide different motions and especially to be able to generate very slow rotations. Moreover, the response of the fluid can be the result of several fluid properties such as both an elastic and a loss modulus and the detected response should be capable of analysis to separately indicate the several properties. Additionally, it is advantageous to provide a viscometer system which employs a methodology of measuring viscous properties that permits cancellation or suppression of unwanted errors in the system.

In our prior U.S. Pat. No. 3,343,405 we disclose an improved rotational viscometer for investigating the viscosity of fluids, especially non-Newtonian liquids. In that patent it is indicated how the instrument is useful for the measurement of very low viscosity values at low shear rates by the use of feedback control to hold one viscometer element, typically a cylindrical cup, stationary while a second viscometer element, usually an inner coaxial bob, is rotated. The fluid whose viscosity is to be measured is contained between the rotating bob and cylindrical cup and its viscous properties produce a corresponding drag on the cylinder which is measured by determining the current necessary to hold the cylinder stationary.

BRIEF SUMMARY OF THE INVENTION

This system of our prior patent has now been modified to include an improved viscometer drive system which produces controlled, low noise rotation of viscometer elements at very slow rates in response to selectable different drive functions. The resulting drive torque measured as a function of time or angular displacement permits separate measurement of fluid viscosity and elasticity as well as related fluid properties such as surface tension.

In the present system, the viscometer drive system permits one viscometer element, here the bob, to be fixed against rotation and thus easily regulated to control fluid temperature while the other viscometer element or cylindrical cup is caused to oscillate in a low friction bearing. A very low frequency periodic signal provided from a function generator is combined with the output signal of a cup angular position sensor to excite a torque generator coupled to the cup and to produce rotation of the cup in conformity with the periodic signal. The periodic signal is typically provided at a rate measured in small numbers of cycles per hour or per day to provide a very slow cup rate useful in rheological investigations.

The magnitude of torque required to oscillate the cup is recorded as a function of cup angle over at least one cycle of rotation and the resulting plot has inherent error rejection and can be analyzed to determine the viscous and elastic properties of the fluid. Different waveforms may be employed, or start-stop sequences utilized depending upon the fluid and the properties under investigation.

BRIEF DESCRIPTION OF THE DRAWINGS

These and other features of the invention will be more fully understood by reference to the below detailed description of a preferred embodiment presented for purposes of illustration, and not by way of limitation, and to the accompanying drawings of which.

DETAILED DESCRIPTION OF THE PREFERRED EMBODIMENT

Figure 1:
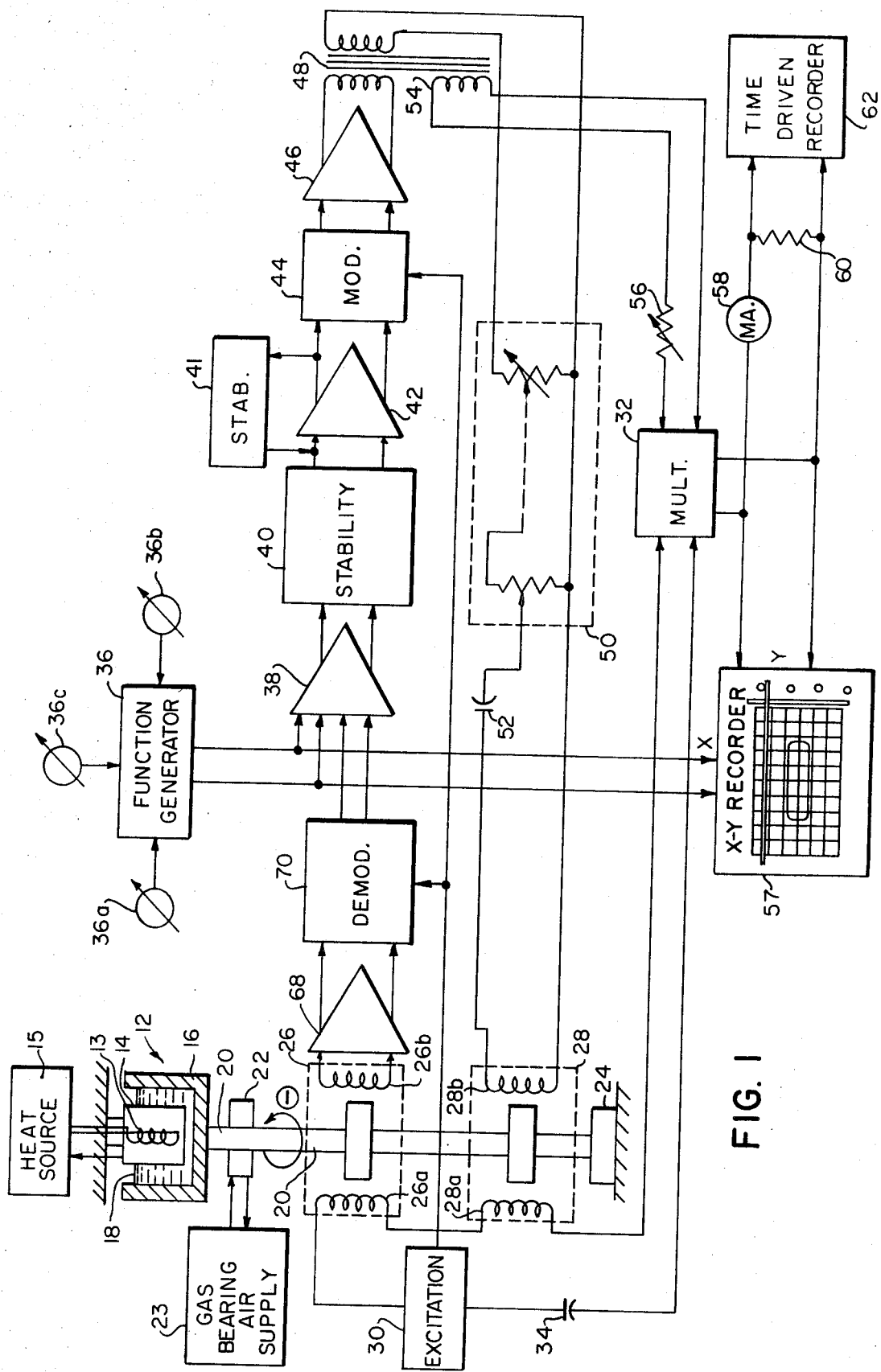
FIG. 1 is a block and partial schematic diagram of improved circuitry according to the invention for measuring fluid viscosity and related properties.

Referring now to FIG. 1 these desirable features are provided in a preferred embodiment of the invention operating with a viscometer 12. The viscometer 12 has a stationary bob 14 surrounded by a cylindrical cup 16. A fluid 18 is contained therebetween, contacting the inner surface of the cup 16 and the outer surface of the bob 14. The bob 14 is heated by a coil 13 which is excited by a fluid or electrical heat source 15. Temperature regulation can be provided by sensing the bob, fluid, or cup temperature with a controller in the source 15 as is known in the art. Since viscous properties often vary rapidly with temperature, control over the fluid temperature is important and greatly simplified by having one element stationary.

The cup 16 is attached to a shaft 20 which is rotationally supported by a gas-bearing 22 to provide low friction restraint over the rotation of shaft 20 and cup 16. Gas-bearing 22 is activated by a gas supply 23 to support shaft 20 on a cushion of air as is known in the art. A thrust bearing 24 at the opposite end of the shaft 20 may also be of gas-bearing design. Along the shaft 20, first and second microsyn units 26 and 28 respectively comprise a signal generator and a torque generator.

The construction of microsyns is indicated in the above referenced U.S. Pat. No. 3,343,405 as generally known in the art. While microsyn signal and torque generators are satisfactory for use in the invention other forms of accurate signal and torque generators may be employed. In brief the structure of a microsyn includes a multi-poled rotor and a multipoled stator with at least two stator poles facing a single rotor pole such that the edges of the rotor pole intersect approximately the center of the stator pole at zero deflection angle. Primary excitation coils 26a and 28a are provided to induce magnetic flux to pass from the rotor poles to the stator poles, and secondary windings 26b and 28b are provided to sense the flux difference in the two stator poles or interact therewith to produce a torque. In signal generator applications, a rotation of the rotor poles will change the flux difference in the stator poles and change the signal on the microsyn secondaries. Similarly the application of excitation to both the primary and secondary coils will cause the rotor to experience a torque in accordance with the current polarities and magnitudes.

Returning to FIG. 1, excitation to the primaries 26a and 28a of the signal and torque generating microsyns 26 and 28 is supplied in series by an alternating current excitation source 30. Current in the primary circuit also is applied to an input of a multiplier circuit 32 and returns to the excitation source 30 through a tuning capacitor 34 which resonates with the primary coils 26a and 28a at the frequency of the source 30.

The viscometer cup element 16 is caused to oscillate in accordance with the waveform of a function generator 36, having respective frequency, amplitude, and waveform controls 36a, 36b, and 36c. The output of the function generator 36 is applied through a summing amplifier 38 to a dynamic stability network 40 which will be explained more fully below. The output of the dynamic stability network 40 is applied through a DC amplifier 42, having further, optional stabilization feedback circuit 41, to a modulator circuit 44 which provides suppressed carrier modulation of the waveform produced by generator 36 onto a carrier signal from the excitation source 30. The resulting signal is in a form suitable for amplification and application to the coil 28b of the torque generator 28 to produce a torque on shaft 20 corresponding to the waveform from the generator 36. The output of the modulator 44 is amplified by an AC amplifier 46 and applied to a primary coil of an isolation transformer 48. The secondary of the transformer 48 is coupled to a multi-stage attenuator 50 which may be as indicated in our above referenced U.S. patent. The output of attenuator 50 is applied to coil 28b of torque generator 28 through a capacitor 52 tuned to series resonance with the coil 28b. Attenuator 50 permits the generation of large torque signals for measurement while only a fraction of that signal is required to torque the cup, and filters out high frequency noise as is desirable at low torque levels.

A secondary pick-off coil 54 from the transformer 48 applies the torque signal, prior to attenuation, through a variable resistor 56 to a second input of the multiplier 32. Multiplier 32 may be of conventional two or four quadrant design or operate on Hall effect or other principles as indicated in the above referenced patent. It is desirable that multiplier 32 have good long term stability.

The output of multiplier 32 is also applied to a Y input of an X–Y plotter 57 while the output of the function generator 36 is applied to an X input of the plotter 57. The plotter will respond to its inputs to draw a closed loop over a cycle of the output from the function generator 36 representing cup torque versus angular displacement having significance which is discussed below. The multiplier output is also fed through a current meter 58 to a load resistance 60 in parallel with a chart recorder 62. Recorder 62 responds to the output of the multiplier 32 to continuously register the torque level as a function of time. The multiplier 32 which inherently provides a demodulation function may also include a filter section to provide smoothing of the output if necessary to prevent jitter in the chart trace.

In order to cause the motion of the torqued cup 16 to closely approximate the waveform of the signal from the function generator 36, positional feedback is provided by the output of the signal generator 26 from the secondary winding 26b. An AC amplifier 68 boosts this signal and applies it to a synchronous demodulator 70 which receives as a demodulation reference a signal from the excitation source 30. The substantially direct current output of the demodulator 70, with filtering as necessary, is applied to further inputs of the summing amplifier 38, in a polarity such that the output of the amplifier 38 represents the difference between the output of signal generator 26 and the output of function generator 36. The amplifiers 38, 42 and 46 are provided with appropriate gain so that this difference or error signal is sufficiently amplified to provide proper torque to the generator 28 according to the known principles of proportional feedback control. Thus, the error between the actual position of the cup 16 as sensed by the signal generator 26, and the value of the waveform of the function generator 36 may be kept as small as desired by suitably adjusting the gains of the amplifiers 38, 42 and 46. The dynamic stability networks 40 and, optionally, 41 are adjusted to provide proper lead-lag to stabilize the feedback control loop. Stabilizing or damping is added to counteract any oscillatory tendency of the loop induced by high gain in the loop and the fact that the major system damping occurs only in the fluid under study.

Figure 2A:
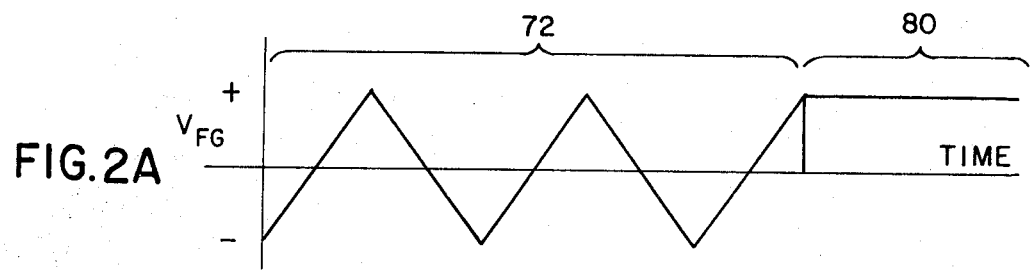
FIGS. 2A–2C are waveform diagrams useful in explaining the operation of the invention.
Figure 2B:
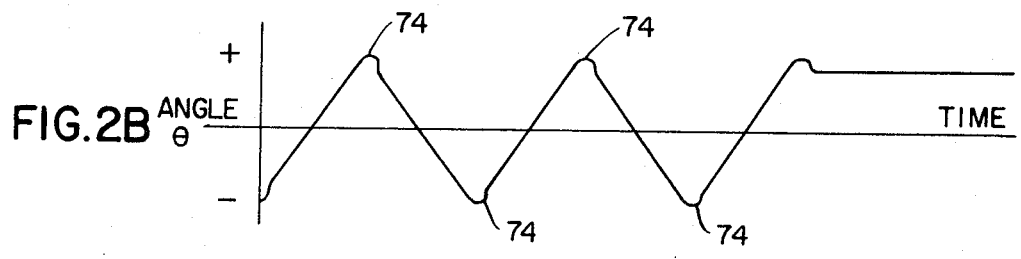

Referring now to FIG. 2, a fuller understanding of the invention may be gained from the waveform diagrams which illustrate the operation of the system. In FIG. 2A a portion 72 of the signal ($V_{FG}$) from the function generator 36 is shown with a triangular waveform typically having a period of from a few seconds to as much as many hours and representative of a useful signal for driving the cup 16 in alternately directed constant rate rotations. In FIG. 2B, the corresponding angle of rotation of cup 16 is indicated as may be found at the output of the demodulator 70. The FIG. 2B waveform will very closely follow the linear extents of the triangle wave portion 72 from generator 36 except at points of reversal 74 where a switching transient is experienced due to the momentum and the inertia of the cup 16 and shaft 20 necessitating a finite length of time for reversing the direction of rotation of cup 16.

Figure 2C:
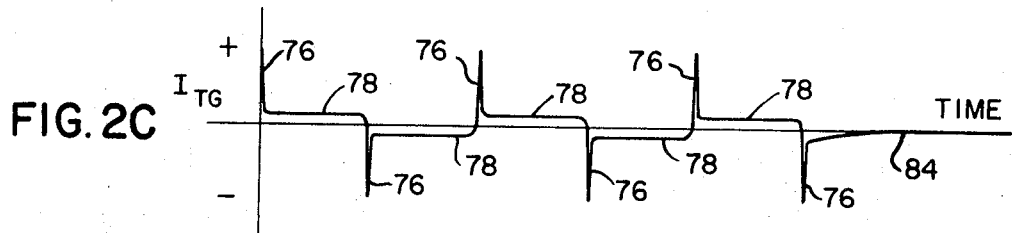

This is typically negligible at the slow drive rates employed. In FIG. 2C the magnitude and polarity of the signal ($I_{TG}$) applied to the torque generator 28 is indicated and shows higher current impulses in portions 76 representative of the extra torque current required to reverse the momentum of the cup 16 and shaft 20 and in more constant intervening portions 78 representative of the amount of torque required to overcome the viscous drag between the bob 14 and cup 16.

Figure 4A:
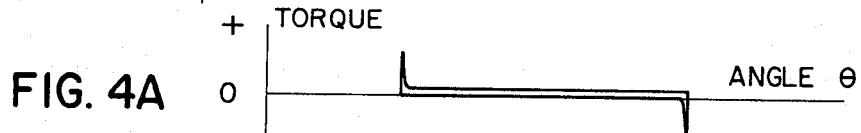
FIGS. 4A–4E are waveform diagrams representing test results of different fluids responding to different oscillatory waveforms.
Figure 4B:
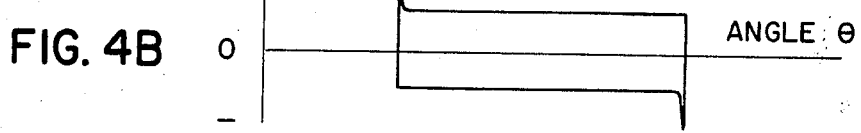

While waveform diagrams such as those indicated in FIGS. 2C and 2B are useful in detecting fluid properties from the indicated torque, it has been discovered that the plots provided by the X-Y plotter 57 present the fluid drag reaction in a form which allows separate measurement of viscous and elastic properties. Referring to FIG. 4A, there is indicated a linear, straight line response typical of low viscosity Newtonian fluids with no elastic properties and is the result of rotating the cup in response to the triangle waveform of FIG. 2A. FIG. 4B shows a greater drag reaction of a higher viscosity fluid evidenced by the greater vertical separation of the closed loop. Any offset errors present in the system are cancelled by the induced positive and negative fluid shear rates used to measure viscous torque.

Figure 4C:
Figure 4D:
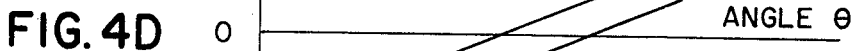

FIG. 4C represents a typical plot of torque versus position for a purely elastic fluid having no viscosity or loss modulus. The slope of the line is proportional to the elastic modulus. FIG. 4D shows the plot from a visco-elastic fluid having both an elastic and loss modulus.

Figure 4E:

With respect to the curve of FIG. 4E, the response of a visco-elastic fluid to a sinusoidal cup oscillation is indicated. The phase angle between the torque and angle signals represents the relationship between loss modulus and elastic modulus. Phase angle may also be determined from parallel torque and angle chart traces from recorder 62. Vertical separation in FIG. 4E represents total torque composed of both elastic and viscous restraints.

Square wave excitation having both positive and negative portions is useful for measurements of non-linear and visco-elastic properties at angular extremes. A positive and negative ramp function having an amplitude periodically returned to the zero level for an interval by an abrupt transition is useful in providing measurements of visco-elastic and surface tension effects. Additional waveforms may be used to provide corresponding cup motions depending on the fluid being studied and the properties sought. Also, other data analysis and processing techniques may be employed to automatically analyze fluids on the basis of the torque and excitation signals.

Figure 3:
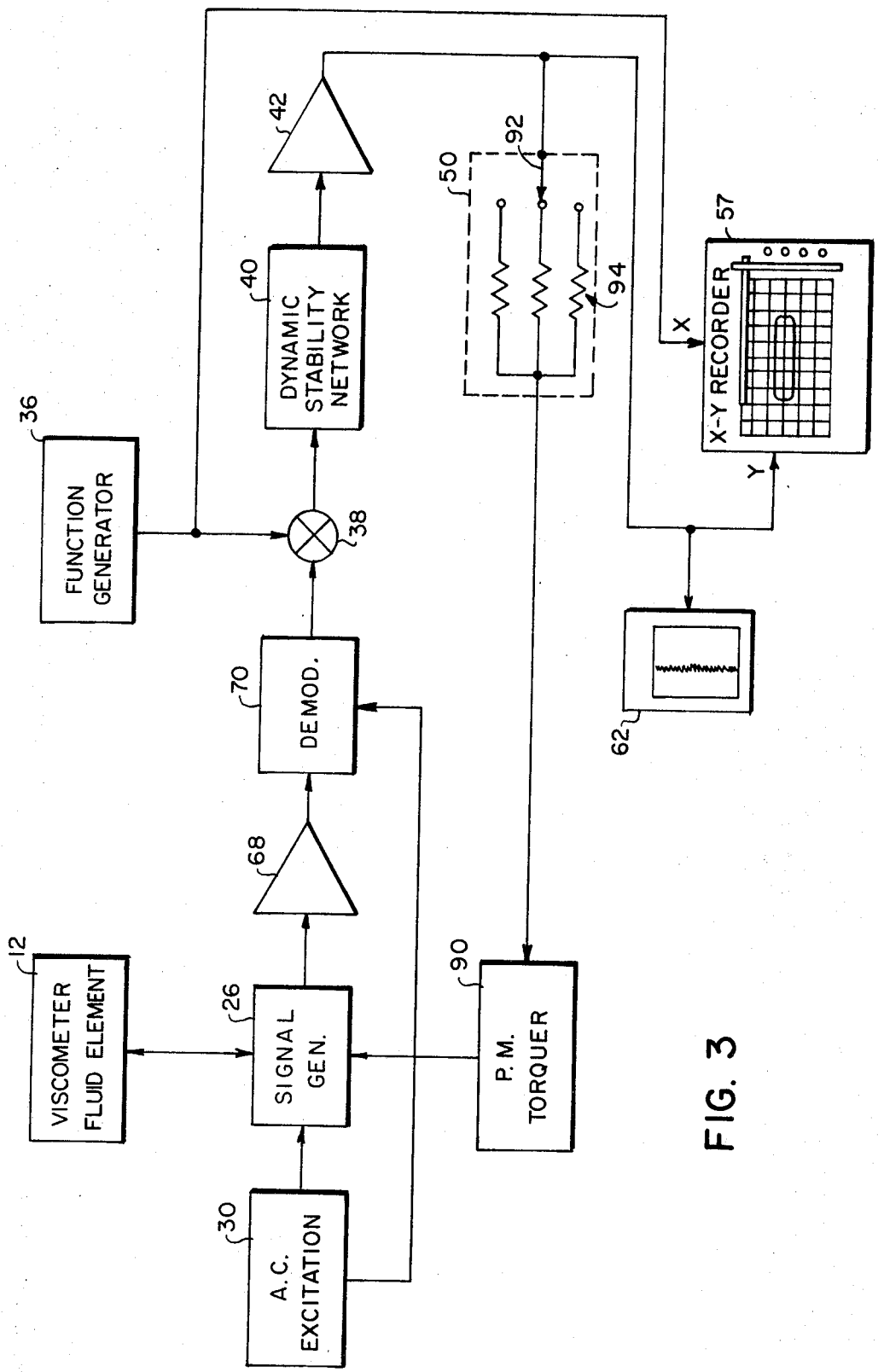
FIG. 3 is a block and partial schematic diagram of a modification of the invention.

Referring now to FIG. 3 a modification of the system is indicated wherein the viscometer 12, signal generator 26, and excitation source 36 are provided as before. The torque is produced by a permanent magnet DC torquer 90 in place of the microsyn torque generator 28. The output of the signal generator 26 is applied to amplifier 68 and demodulator 70 and the output of the demodulator 70 is differenced in amplifier 38 with the output of the function generator 36. The dynamic stability network 40 is provided as before along with DC amplifier 42. The output of the DC amplifier 42, however, is applied directly to the attenuator 50 and thence to the torquing winding of torque generator 90. Attenuator 50 further comprises a switch 92 connected to place one of plural resistors 94 in series between the output of amplifier 42 and torquer 90. The DC signal from the amplifier 42 is applied to inputs of recorder 62 and plotter 57 as before. Plotter 57 also receives on a further input the signal from generator 36 to provide torque versus angle plots for the fluid under study.

By using the permanent magnet DC torquer 90, there is no need for a multiplier to generate a signal representative of the product of the torque primary and secondary currents. This in turn eliminates a further source of error in the recorded or plotted fluid response. The DC torque generator 90 has the further advantage of being able to provide greater torque for the same size and inertia than an AC torquer which saturates on signal peaks at a lower average torque level. Similarly DC torquing avoids phase problems and core losses which occur with AC torquers.

The simplified viscometer structure of the present invention has the advantage of being capable of operation with the cup kept stationary and the bob oscillated by the torque generator. In this configuration the cup may be heated and thermal gradients in the fluid reduced. The cup, however, is more hydrodynamically stable and higher shear rates may be achieved without turbulence.

As structured above, a viscometer and associated drive system combine to provide an accurate means for applying a predetermined shear rate to a fluid and detecting the resulting drag. The shear rate can be controlled to follow different waveforms at very slow rates and to produce different drag reactions that allow a more complete analysis of complex fluids and separate measurement of viscous and elastic reactions when plotted as a function of time or angular deflection of the viscometer elements.

Having described above preferred embodiments of the present invention, it will occur to those skilled in the art that various modifications and alterations can be made without departing from the spirit of the invention. It is accordingly intended to limit the scope of the invention only as indicated in the following claims.

What is claimed is:

1. Apparatus for measuring fluid properties from controlled relative rotation between first and second viscometer elements having therebetween a fluid the properties of which are to be measured, said apparatus comprising:

means for generating a drive signal having a waveform representing predetermined desired relative rotation between said viscometer elements;

means for generating a torque signal in response to said drive signal;

means for torquing said first element over a predetermined angular extent in response to said torque signal;

means responsive to rotation of said first element for providing a position signal representative of angular position of said first element with respect to said second element through said predetermined angle; and means responsive to said position signal for providing position feedback control of said torque signal whereby said first viscometer element is torqued to maintain close relative angular correspondence with the waveform of said drive signal.

2. The apparatus for measuring fluid properties of claim 1 wherein:
said drive signal is a triangle wave.

3. The apparatus for measuring fluid properties of claim 1 wherein said drive signal has an interval of constant amplitude whereby said torque signal is representative of fluid viscoelastic properties.

4. The apparatus for measuring fluid properties of claim 1 wherein said drive signal is a sinusoid thereby to permit phase measurements of Newtonian fluids and detection of nonlinear features of non-Newtonian fluids.

5. The apparatus for measuring fluid properties of claim 1 wherein said drive signal varies at a very slow rate to cause an angular rotation of said viscometer elements as slow as a few cycles per hour.

6. The apparatus for measuring fluid properties of claim 1 wherein said torque generating means is a DC torque generator.

7. The apparatus for measuring fluid properties of claim 1 further including means responsive to said torque and drive signals to provide a graphical representation of the variation of one with respect to the other and permit separate measurement of viscous and elastic fluid properties.

8. The apparatus for measuring fluid properties of claim 1 wherein:
one of said viscometer elements is fixed; and
means are provided to temperature control the fixed element so as to adjust the fluid temperature.

9. The apparatus for measuring fluid properties of claim 1 wherein:
said position signal providing means includes means for providing an alternating current excitation signal thereto to provide said position signal as an alternating current signal;
means are provided for demodulating said position signal to provide a direct current signal representative of the angle of rotation of said first element;
said torque signal generating means further includes:
means for differencing said drive signal and said demodulated position signal to provide a difference signal indicative of deviation in the angular position of said first element; and
means for amplifying said difference signal to provide said torque signal from small relative differences between said demodulated position signal and said drive signal thereby to provide negative proportional feedback control over the relative rotation of said first viscometer element.

10. The apparatus for measuring fluid properties of claim 9 further including means for stabilizing said torque signal to provide quick response to said drive signal and said difference signal without permitting oscillation of said first element independent of said drive signal.

11. The apparatus for measuring fluid properties of claim 9 wherein said torquing means includes:
an excitation source providing an excitation current to said torquing means with the resulting torque from said torquing means being representative of the magnitudes of said excitation current and said torque signal; and
means for providing an output indication of the response of said first element as a combination of said torquing means excitation current and said torque signal.

12. The apparatus for measuring fluid properties of claim 9 further including:
means for modulating said difference signal with said excitation signal; and
means for exciting said torquing means with said excitation signal.

13. The apparatus for viscosity measurement of claim 1 further including means for selectively attenuating said torque signal as applied to said torquing means whereby said torque signal has a greater magnitude than necessary to torque said first element thereby to facilitate torque signal measurement.

14. The apparatus for measuring fluid properties of claim 1 including low friction, gas bearing support means for the first element of said viscometer to allow low friction rotation thereof with respect to the second of the elements of said viscometer.

15. In a viscometer of the type having first and second elements defining an annular cavity therebetween adapted to contain a fluid whose viscous properties are to be measured, a system for producing controlled rotation of said first viscometer element with respect to the other and comprising:
means for supporting said second element against rotation;
means for temperature controlling said second, stationary element;
a function generator operative to provide an output drive signal having a predetermined waveform;
means for sensing the angle of rotation of said first element and for producing an output position signal representative thereof;
means for differencing said position signal and said drive signal to provide a difference signal representative of the deviation between actual angular position of said first element and the angular position represented by said position signal;
means for amplifying said difference signal;
an electromagnetic torque generator responsive to the amplified difference signal to apply a corresponding torque to said first viscometer element;
fluid bearing means for rotationally supporting said first element;
lead-lag means for applying damping to said difference signal to stabilize the response of said system; and
means for providing a graphical representation of said difference signal as a function of said position signal.

16. The system for producing controlled rotation of claim 15 wherein said torque generator is a permanent magnet DC torque generator.

17. The system for producing controlled rotation of claim 15 further including means for selectively attenuating said difference signal whereby the relationship between the torque applied to said first element and said difference signal may be adjusted.

18. A method of measuring the viscous properties of a fluid using a viscometer having first and second relatively rotatable elements and a cavity therebetween for containing the fluid being studied, said method including the steps of:

sensing angular position of said first viscometer element;

torquing said first viscometer element in position feedback controlled correspondence with a predetermined waveform;

plotting the level of torque applied to said first viscometer element as a function of said waveform to produce a closed loop plot and having a shape reflecting viscous and elastic properties.

* * * * *